US010761678B2

(12) United States Patent
Guo (10) Patent No.: US 10,761,678 B2
(45) Date of Patent: Sep. 1, 2020

(54) CONTROL METHOD AND ELECTRONIC DEVICE

(71) Applicant: Lenovo (Beijing) Co., Ltd., Beijing (CN)

(72) Inventor: Cheng Guo, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 569 days.

(21) Appl. No.: 14/663,612

(22) Filed: Mar. 20, 2015

(65) Prior Publication Data

US 2016/0077707 A1 Mar. 17, 2016

(30) Foreign Application Priority Data

Sep. 15, 2014 (CN) .......................... 2014 1 0468332

(51) Int. Cl.
*G06F 3/0481* (2013.01)
*G04G 21/08* (2010.01)
(Continued)

(52) U.S. Cl.
CPC ......... *G06F 3/04817* (2013.01); *G04G 21/08* (2013.01); *G06F 3/0482* (2013.01);
(Continued)

(58) Field of Classification Search
CPC ................................................. G06F 3/04817
See application file for complete search history.

(56) References Cited

U.S. PATENT DOCUMENTS 6,556,222 B1 4/2003 Narayanaswami
6,754,660 B1 * 6/2004 MacPhail .............. G06F 3/0482
(Continued)

FOREIGN PATENT DOCUMENTS

CN 1330303 A 1/2002
CN 1606727 A 4/2005
(Continued)

OTHER PUBLICATIONS

Merriam Webster, "Definition of Lateral", https://www.merriam-webster.com/dictionary/lateral.*
(Continued)

*Primary Examiner* — Anil K Bhargava
(74) *Attorney, Agent, or Firm* — Harness, Dickey & Pierce, P.L.C.

(57) ABSTRACT

A control method and an electronic device are provided. The electronic device includes a housing, a display screen and K inputting apparatuses. The display screen is fixed in the housing and a display output area of the display screen is visible through a first surface of the housing. The K inputting apparatuses are fixed in the housing and an operation surface of each of the K inputting apparatuses is exposed through a lateral surface of the housing. The electronic device is adapted to control the display screen to display M indicating icons on a periphery of the display output area. The electronic device is adapted to acquire, via the operation surface, the input operation at a first operation position on the operation surface, and perform a first function represented by a first indicating icon corresponding to the first operation position in response to the input operation.

10 Claims, 5 Drawing Sheets

(51) Int. Cl.
*G06F 3/0482* (2013.01)
*G06F 3/0484* (2013.01)
*H04M 1/725* (2006.01)

(52) U.S. Cl.
CPC .. *G06F 3/04842* (2013.01); *G06F 2203/0339* (2013.01); *H04M 1/7253* (2013.01); *H04M 1/72583* (2013.01)

(56) References Cited

U.S. PATENT DOCUMENTS

| | | | |
|---|---|---|---|
| 7,619,677 B2 | 11/2009 | Matsuda et al. | |
| 7,975,242 B2* | 7/2011 | Forstall | G06F 3/0488 715/773 |
| 9,477,320 B2* | 10/2016 | Schaffer | G06F 3/02 |
| 9,489,081 B2* | 11/2016 | Anzures | H04L 51/10 |
| 9,521,245 B2* | 12/2016 | Yang | G04G 21/04 |
| 9,535,503 B2* | 1/2017 | Gardenfors | G06F 3/017 |
| 2005/0043063 A1 | 2/2005 | Dinn | |
| 2006/0284852 A1* | 12/2006 | Hofmeister | G06F 3/0483 345/173 |
| 2007/0024736 A1 | 2/2007 | Matsuda et al. | |
| 2007/0198954 A1 | 8/2007 | Dinn | |
| 2007/0218433 A1* | 9/2007 | Vanova | G09B 19/025 434/188 |
| 2007/0285439 A1* | 12/2007 | King | G09G 5/397 345/638 |
| 2008/0248838 A1* | 10/2008 | Chiang | G04G 21/04 455/566 |
| 2010/0287470 A1* | 11/2010 | Homma | G06F 3/03547 715/702 |
| 2010/0306702 A1* | 12/2010 | Warner | G06F 3/0482 715/811 |
| 2011/0157046 A1* | 6/2011 | Lee | G04G 21/08 345/173 |
| 2011/0183720 A1 | 7/2011 | Dinn | |
| 2011/0209057 A1* | 8/2011 | Hinckley | G06F 1/1641 715/702 |
| 2011/0252375 A1* | 10/2011 | Chaudhri | H04M 1/72583 715/835 |
| 2013/0227490 A1* | 8/2013 | Thorsander | G06F 3/04883 715/841 |
| 2014/0104180 A1* | 4/2014 | Schaffer | G06F 3/02 345/169 |
| 2014/0149903 A1* | 5/2014 | Ahn | G06F 3/0488 715/765 |
| 2014/0282132 A1* | 9/2014 | Daly, IV | G06F 3/04817 715/763 |
| 2015/0089386 A1* | 3/2015 | Brisebois | G06F 3/0488 715/746 |
| 2015/0111558 A1* | 4/2015 | Yang | G04G 21/04 455/418 |
| 2015/0113426 A1* | 4/2015 | Okubo | H04W 4/90 715/744 |
| 2015/0186030 A1* | 7/2015 | Yoo | G06F 1/163 715/769 |
| 2015/0286381 A1* | 10/2015 | Nguyen | H04L 51/12 715/752 |
| 2015/0324000 A1* | 11/2015 | Park | G06F 3/014 345/156 |
| 2015/0355684 A1* | 12/2015 | Nakamura | G06F 1/1626 361/679.3 |
| 2016/0224209 A1* | 8/2016 | Takeda | H04N 7/18 |

FOREIGN PATENT DOCUMENTS

| | | |
|---|---|---|
| CN | 1901625 A | 1/2007 |
| KR | 20050056395 A | 6/2005 |

OTHER PUBLICATIONS

Casio GM-10 game watch, 1980, [online] https://www.polygon.com/a/smartwatch-history-guide-evolution/watch-timeline (Year: 1980).*

Casio "Service manual & parts list", published on Oct. 2009, [online] http://www.support.casio-europe.com/support/files/WAT/S_Manual/S960_608.pdf (Year: 2009).*

First Chinese Office Action regarding Application No. 201410468332.2 dated Nov. 30, 2016. English translation provided by Unitalen Attorneys at Law.

* cited by examiner

CONTROL METHOD AND ELECTRONIC DEVICE

The present application claims priority to Chinese Patent Application No. 201410468332.2, entitled "CONTROL METHOD AND ELECTRONIC DEVICE", filed on Sep. 15, 2014 with the State Intellectual Property Office of People's Republic of China, which is incorporated herein by reference in its entirety.

FIELD

The present disclosure relates to the field of electronic technology, and in particular to a control method and an electronic device.

BACKGROUND

With an electronic device getting more and more powerful, display screens of most electronic device may serve as an operating panel, as well as information display. That is, the display screen may serve as a Graphical User Interface (GUI) for human-machine interaction. A user may perform a corresponding operation based on an interface content displayed in the GUI and practical requirement, for conveniently achieving a function corresponding to the interface content, such as making a call, storing information or sending a mail.

However, since the GUI in many electronic device has a small area, the operation of the user is inconveniently affected, because the current display content in the interface is generally covered when the user performs the human-machine interaction operation on the GUI.

SUMMARY

A control method is provided, which includes: controlling a display screen of an electronic device to display M indicating icons with respect to a plurality of inputting apparatus arranged on the electronic device, wherein M is a positive integer equal to or greater than 1; acquiring an input operation inputted via a first inputting apparatus of the plurality of inputting apparatus, wherein the input operation relates to a first function that corresponds to a first indicating icon; and performing the first function, in response to the input operation.

An electronic device is provided, which includes: a display screen, a plurality of inputting apparatus arranged with respect to the display screen, wherein the display screen is operable to display M indicating icons, wherein M is a positive integer equal to or greater than 1; and a processor adapted to acquire an input operation inputted via a first inputting apparatus of the plurality of inputting apparatuses, the input operation relating to a first function that corresponds to a first indicating icon; and to perform the first function, in response to the input operation.

BRIEF DESCRIPTION OF THE DRAWINGS

In order to illustrate the technical solutions in the embodiments of the present disclosure or in the conventional art more clearly, drawings to be used in the description of the conventional art or the embodiments will be described briefly hereinafter. Apparently, the drawings described hereinafter are only some embodiments of the present disclosure, and other drawings may be obtained by those skilled in the art according to those drawings without creative labor.

FIG. 2(*a*) is a schematic diagram of a display interface of an electronic device according to an embodiment of the disclosure.

FIG. 2(*b*) is a schematic diagram of another display interface of an electronic device according to an embodiment of the disclosure.

FIG. 2(*c*) is a schematic diagram of yet another display interface of an electronic device according to an embodiment of the disclosure.

FIG. 2(*d*) is a schematic diagram of a further another display interface of an electronic device according to an embodiment of the disclosure.

DETAILED DESCRIPTION OF EMBODIMENTS

Hereinafter, the technical solutions in the embodiment of the present disclosure will be described clearly and completely in conjunction with the drawings in the embodiment of the present disclosure. Obviously, the described embodiments are only some of the embodiments of the present disclosure, but not all the embodiments. All the other embodiments obtained by those skilled in the art based on the embodiment in the present disclosure without creative labor will fall within the scope of protection of the present disclosure.

A control method is provided in an embodiment of the disclosure, which is applicable to an electronic device. The electronic device includes: a housing, a display screen and K inputting apparatuses. The display screen is fixed in the housing and a display output area of the display screen is visible through a first surface of the housing. The K inputting apparatuses are fixed in the housing and an operation surface of each of the K inputting apparatuses is exposed through a lateral surface of the housing. In practice, the electronic device is adapted to control the display screen to display M indicating icons on a periphery of the display output area. Each of the M indicating icons may be adapted to indicate an operation position of the respective operation surface exposed through the lateral surface of the housing. An operation may be performed by a user at the operation position of the operation surface as required. The electronic device is adapted to acquire, via the operation surface, the input operation for a first operation position on the operation surface; and perform a first function represented by a first indicating icon and corresponding to the first operation position in response to the input operation, thereby ensuring the correspondence between the current operation of the user on the operation position of the operation surface and the function represented by the control displayed at the current display interface in the display output area. In this way, the operation may be perform on the electronic device by the user without any operation on the display position of the indicating icon in the display output area, and thus solving the problem in the conventional art that the display content in the display position is covered because the user performs the operation on the display position of the indicating icon in the display output area of the display screen.

Figure 1:
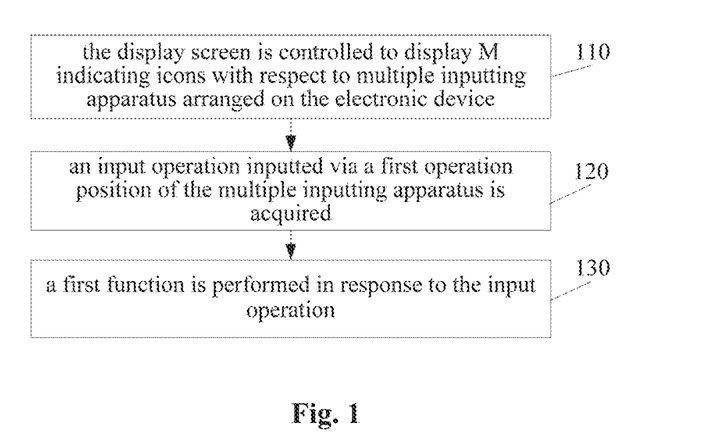
FIG. 1 is a schematic flowchart of a control method according to an embodiment of the disclosure.

Referring to FIG. 1, a schematic flowchart of a control method according to an embodiment of the disclosure is shown. The control method is applicable to an electronic device. The electronic device includes a housing, a display screen and K inputting apparatuses. The display screen is fixed in the housing and a display output area of the display screen is visible through a first surface of the housing. The K inputting apparatuses are fixed in the housing and an operation surface of each of the K inputting apparatuses is exposed through a lateral surface of the housing. For example, the electronic device may be a smart watch, and the control method according to an embodiment of the disclosure may include steps S110 to S130 as follows.

In step S110, the display screen is controlled to display M indicating icons with respect to multiple inputting apparatus arranged on the electronic device.

M is a positive integer equal to or greater than 1. Each of the indicating icons displayed in the display output area of the display screen of the electronic device is adapted to indicate an operation position of the respective operation surface exposed through the lateral surface of the housing of the electronic device. Thus, the user may determine an operation position corresponding to the display position of the indicating icon based on the display position of the indicating icon. In practice, with the change of the application scene applied to the electronic device or the change of the program performed by the electronic device, the current display interface in the display output area of the display screen generally changes, the number of the indicating icons displayed in the display interface varies, and the function represented by the indicating icon changes.

Figure 2A:
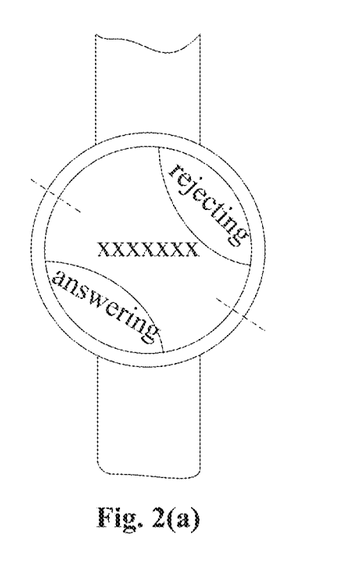

As an example, when the electronic device is in a called state, as shown in FIG. 2(a), a calling number or a name of a caller may be displayed in the display output area of the display screen of the electronic device, an answering indicating icon is provided in the 7 o'clock direction of the display output area, a rejecting indicating icon is provided in the 1 o'clock direction of the display output area. That is, when the electronic device is in the called state, two indicating icons are displayed in the display output area of the display screen of the electronic device, where one indicating icon represents a function of answering the call, and the other one represents a function of rejecting the call.

Figure 2B:
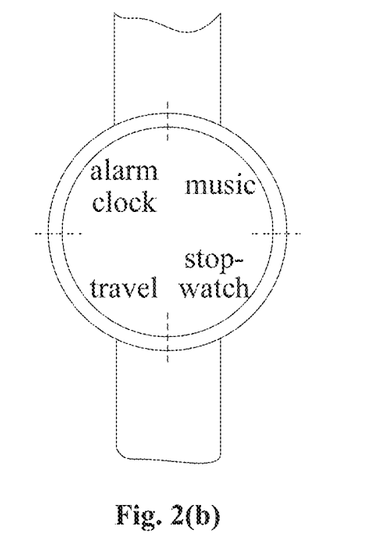
Figure 2C:
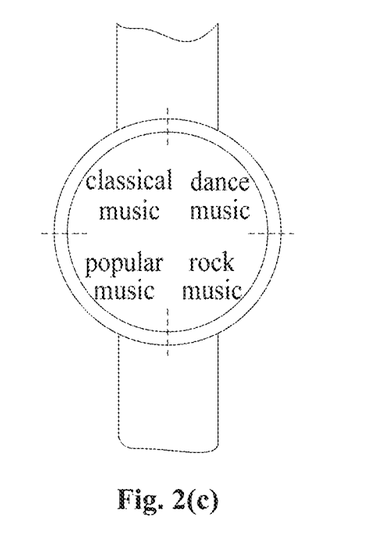

When the electronic device presents an application main interface, as shown in FIG. 2(b), four indicating icons of "alarm clock", "music", "travel" and "stopwatch" are displayed in the current display interface on the display output area of the display screen. Those four indicating icons are taken as an example for illustration in FIG. 2, and the present disclosure is not limited thereto. In this case, the user may perform an operation on the operation position of the operation surface corresponding to an indicating icon, to display the operation interface of this indicating icon, where the operation surface is exposed through the lateral surface of the housing. For example, when the user may perform an operation on the operation position of the operation surface corresponding to the music indicating icon, the display output area of the display screen switches to the operation interface as shown in FIG. 2(c). Then, the user may perform an operation on the operation position of the operation surface corresponding to the selected music type indicating icon, such as the rock indicating icon, the current display interface in the display output area switches to an interface in which all rock types of music or singers stored in the electronic device are displayed. As compared with the interface shown in FIG. 2(b), the number and the functions of the indicating icons displayed in the interface shown in FIG. 2(c) are changed, and the number and the functions of the indicating icons are depend on the number of the rock type of music or singers pre-stored in the electronic device and the maximum number of the indicating icons that can be displayed in the display output area, which is not described in detail herein.

Figure 2D:
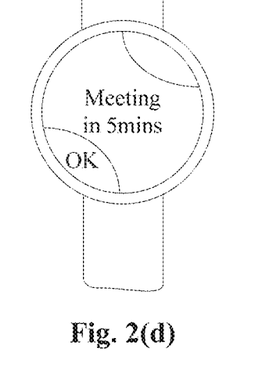

When the electronic device presents an event notification state, as shown in FIG. 2(d), the display output area of the display screen switches from a common time display interface into an even notification interface. A content of the notified event and a confirmation indicating icon for confirming this event may be displayed in the even notification interface. In the disclosure, the confirmation indicating icon may include one indicating icon, or may include two indicating icons as shown in FIG. 2(d). In the case of two indicating icons, only when the user performs an operation on both the operation positions of the operation surface corresponding to the indicating icons in the 1 o'clock and the 7 o'clock directions, the electronic device performs the function corresponding to both of the two indicating icons, i.e., the confirmation even, and then switches back to the common interface.

Thus, in an embodiment of the disclosure, in conjunction with FIG. 2(a) and FIG. 2(d), when the current display interface in the display output area of the display screen of the electronic device changes, the function represented by the indicating icon may vary even if the number of the indicating icons displayed in the display interface and the display position of the indicating icon both keep constant. That is, the function represented by the indicating icon depends on the content in the current display interface of the display output area of the display screen. One indicating icon may represent one function. Alternatively, multiple indicating icons may represent one function, which is not defined in detail in the disclosure.

With the above analysis, in an implementation of the disclosure, following two methods may be adopted to trigger the electronic device to perform step S110, and the disclosure is not limited thereto.

First Method

Upon a reception of a call instruction, the electronic device may start an application corresponding to the call instruction and control the display screen to display the display interface corresponding to the application in the display output area, in response to the call instruction. The M indicating icons are displayed in the display interface. That is, the electronic device may control the display screen to display the M indicating icons on the periphery of the display output area.

For example, on a reception of an incoming call, the electronic device may call a communication application directly. The display interface as shown in FIG. 2(a) is displayed in the display output area of the display screen. A phone number of the calling party and an answering indicating icon and a rejecting indicating icon are displayed in the display interface.

Second Method

In an implementation of the electronic device, a common display interface in the display output area of the display screen is a time display interface in which information such as current time and/or date is displayed. The user may perform an input operation on any one of the operation surfaces exposed through the lateral surface of the housing, where the K inputting apparatuses are provided in the housing. Thus, the electronic device may acquire a trigger instruction (i.e., the input operation) via the operation surface, and change the current display interface in the display output area of the display screen in response to the trigger instruction, i.e., control the display screen to arrange and display the M indicating icons on the periphery of the display output area.

For example, the display interface as shown in FIG. 2(b) is displayed in the display output area of the display screen of the electronic device in response to the acquired trigger instruction. Practically, the contents displayed in the display interface are different due to different applications provided in the electronic device, which is not limited to that shown in FIG. 2(b) and can be set by those skilled in the art based on the practical requirement or user custom. All these determined by those skilled in the art without creative labor fall within the scope of protection of the disclosure.

In step S120, an input operation inputted via a first operation position of the multiple inputting apparatus is acquired, where the input operation relates to a first function that corresponds to a first indicating icon.

In an implementation, based on the correspondence between the display position of the indicating icon in the display interface in the display output area of the display screen of the electronic device and the operation position of the indicating icon on the housing, the user may perform an input operation at the operation position indicated by the indicating icon displayed in the current display interface, and the input operation is acquired by the electronic device via the operation surface exposed through the lateral surface of the housing.

To achieve the above input operation, the K inputting apparatuses in the electronic device may be one or more keys, touch sensing units, pressure sensors, distance sensors, voice modules or the like, where K is a positive integer equal to or greater than 1. Thus, in the disclosure, one inputting apparatus may correspond to one key, touch sensing unit, pressure sensor, distance sensor or voice module. Alternatively, multiple inputting apparatuses may correspond to one touch sensing unit etc., which is not defined in detail in the disclosure. It is to be noted, if multiple inputting apparatuses correspond to one touch sensing unit, the touch surface of the touch sensing unit is the whole operation surface exposed through the lateral surface of the housing.

If the K inputting apparatuses are multiple keys, touch sensing units, pressure sensors or the like, above FIG. 2(b) or FIG. 2(c) is taken as an example. When the K inputting apparatuses are four keys, because the number of the keys is the same as the number of the indicating icons displayed in the current display interface, a corresponding operation surface exposed through the lateral surface of the housing may be assigned to each key as shown by a dashed line in FIG. 2(b) or FIG. 2(c). Any other assigning way may be adopted, which is not defined in the disclosure. That is, an operation surface is assigned to a respective key according to the relation between display positions of the indicating icons in the current display interface, so that the operation surface of one of the keys corresponds to the display position of one of the indicating icons, and thus the input operation may be performed by the user according to the indication of the indicating icon displayed in the current display interface.

It is to be noted, when the display interface in the display output area of the display screen of the electronic device changes, the operation position on the operation surface corresponding to the display position of the displayed indicating icon changes, but the relation between the display position of the indicating icon displayed in any display interface and the operation position corresponding to the indicating icon is constant.

In step S130, a first function is performed in response to the input operation.

In step S130, the first indicating icon may be one or more indicating icons displayed in the current display interface of the electronic device. Thus, the number of the indicating icons representing one function of the electronic device may be determined according to practical requirement or the habit, which is not defined in detail herein.

In the example as shown in FIG. 2(b) and FIG. 2(c), the first indicating icon is the music indicating icon displayed in the display interface in FIG. 2(b), the first function corresponding to the first indicating icon is to open a music classification table, as shown in FIG. 2(c). In the example as shown in FIG. 2(d), the first indicating icon includes the indicating icon in the 1 o'clock direction and the OK indicating icon in the 7 o'clock direction in the current display interface, and the two indicating icons correspond to one function, which is a confirmation event. In practice, three or more indicating icons displayed in the current display interface may correspond to one function. Only when the input operation are acquired at the operation positions corresponding to the display positions of the indicating icons corresponding to the one function, the input operation becomes valid and the electronic device performs the function in response to this input operation.

With the above analysis, in the embodiment of the disclosure, the electronic device is adapted to control the display screen to display M indicating icons on a periphery of the display output area. The M indicating icons may be adapted to indicate an operation position of the operation surface exposed through the lateral surface of the housing. If a user performs an operation at the first operation position of the operation surface as required, the electronic device is adapted to acquire, via the operation surface, the input operation at a first operation position of the operation surface, and perform a first function represented by a first indicating icon corresponding to the first operation position in response to the input operation, thereby ensuring the correspondence between the current operation of the user at the operation position of the operation surface and the function represented by the indicating icon displayed in the current display interface in the display output area. In this way, the function represented by the indicating icon displayed in the current display interface of the display screen of the electronic device is performed accurately without an input operation at the display position of the indicating icon displayed in the display interface, and thus solving the problem in the conventional art that the display content in the display position is covered because the user performs the operation at the display position of the indicating icon displayed in the display output area of the display screen.

Figure 3:
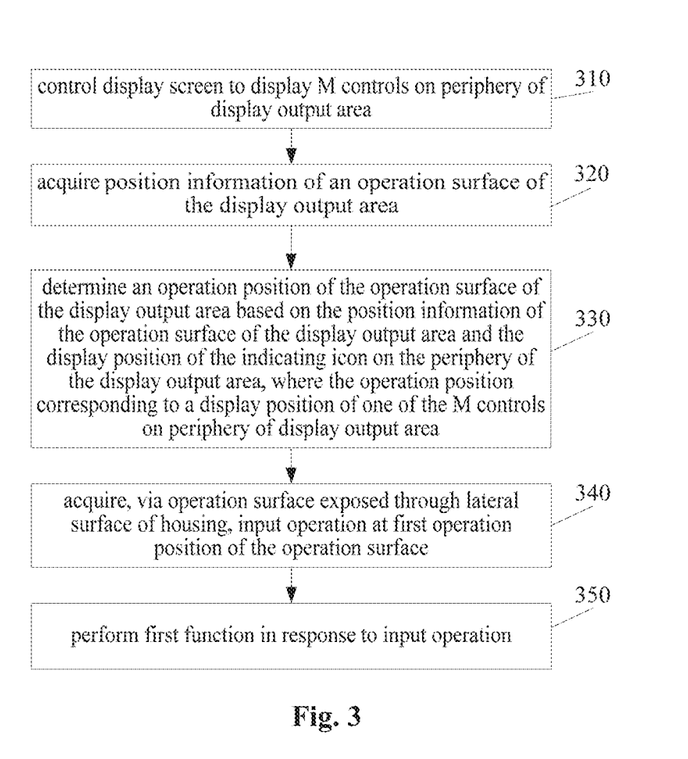
FIG. 3 is a schematic flowchart of another control method according to an embodiment of the disclosure.

Referring to FIG. 3, a schematic flowchart of another control method according to an embodiment of the disclosure is shown. The method is applicable to an electronic device. The electronic device includes a housing, a display screen and K inputting apparatuses. The display screen is fixed in the housing and a display output area of the display screen is visible through a first surface of the housing. The K inputting apparatuses are fixed in the housing and an operation surface of each of the K inputting apparatuses is exposed through a lateral surface of the housing. For example, the electronic device may be a smart watch, and the control method according to an embodiment of the disclosure may include steps S310 to S350 as follows.

In step S310, the display screen of the electronic device is controlled to display M indicating icons on a periphery of the display output area.

The M indicating icons correspond to control instructions to instruct the electronic device to perform N functions, where M and N are positive integers and M≥N≥1.

In the present disclosure, as described in the above embodiment, the indicating icons displayed in the display interface of the display screen of the electronic device and the functions represented by the indicating icons do not necessarily have the one-to-one correspondence. That is, multiple indicating icons displayed in the display interface may represent one function, such as a zoom function to be represented by two indicating icons, and the number of the indicating icons displayed in the display interface is greater than the number of the functions to be performed by the electronic device.

An external signal or instruction may trigger the electronic device to perform step S310. Upon a reception of a call instruction, the electronic device may start an application corresponding to the call instruction and control the display screen to display the display interface corresponding to the application in the display output area, in response to the call instruction. The M indicating icons are displayed in the display interface.

Alternatively, an operation of the user may trigger the electronic device to perform step S310. The electronic device may acquire a trigger instruction via any one of the operation surfaces of the K inputting apparatuses in the housing, and control the display screen to display the M indicating icons on the periphery of the display output area in response to the trigger instruction. The form of the trigger instruction is determined by the inputting apparatus. For example, if the inputting apparatus is a touch sensing unit, the trigger instruction is a touch trigger; and if the inputting apparatus is a voice module, the trigger instruction is a voice trigger, which will not be listed one by one here.

In step S320, position information of an operation surface of the display output area is acquired.

In the present disclosure, the K inputting apparatuses are provided in the housing of the electronic device, and the visible lateral surface of the housing is the operation surface of the inputting apparatus. Each inputting apparatus has a corresponding operation surface on the lateral surface of the housing. Thus, the position information on the operation surface of the inputting apparatus is defined.

In step S330, an operation position of the operation surface of the display output area is determined based on the position information of the operation surface of the display output area and the display position of the indicating icon on the periphery of the display output area, where the operation position corresponds to a display position of one of the M indicating icons on the periphery of the display output area.

Each indicating icon displayed in the current display interface of the display screen of the electronic device has a unique display position, and each display position in the display output area corresponds to one operation position on the lateral surface of the housing. Thus, there is a one-to-one correspondence between the display position and the operation position of the indicating icon displayed in the current display interface.

In step S340, an input operation at a first operation position of the operation surface exposed through the lateral surface of the housing is acquired via the operation surface.

The first operation position generally refers to the operation position selected by the user, which corresponds to the display position of a certain indicating icon.

In step S350, a first function is performed in response to the input operation.

The first indicating icon is the indicating icon selected by the user from the indicating icons in the current display interface of the display output area. The first indicating icon may be one indicating icon, or may be multiple indicating icons. The first function is the one function represented by the one or more indicating icons.

Therefore, in the embodiment of the disclosure, with the correspondence between the display position and the operation position of the indicating icon displayed in the display interface of the display output area, it is ensured that after a user performs an input operation in the corresponding operation position based on the indication of the indicating icon, the electronic device can acquire the input operation accurately, and perform the function represented by the indicating icon corresponding to the operation position, thereby meeting the operation requirement of the user to the current display interface, without an input operation at the display position of the indicating icon displayed in the display interface. In this way, it is solved the problem in the conventional art that the display content in the display position is covered because the user performs the operation at the display position of the indicating icon displayed in the display output area of the display screen.

Figure 4:
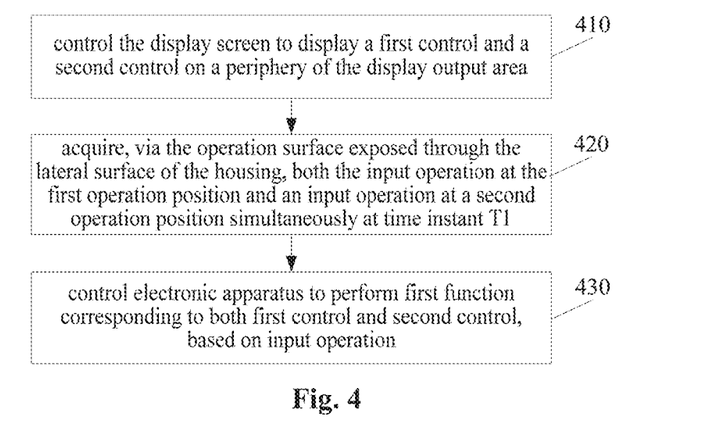
FIG. 4 is a schematic flowchart of yet another control method according to an embodiment of the disclosure.

In the case of one function represented by multiple indicating icons in the display interface, as shown in FIG. 4, taking two indicating icons representing one function as an example, the control method may include steps 410 to 430 as follows.

In step S410, the display screen is controlled to display a first indicating icon and a second indicating icon on a periphery of the display output area.

The first indicating icon and the second indicating icon correspond to a first function. In practice, the first function may be a zoom function, or may be the event confirmation function as shown in FIG. 2 or the like.

In step S420, both the input operation at the first operation position and an input operation at a second operation position are acquired simultaneously at a time instant T1, via the operation surface exposed through the lateral surface of the housing.

The first operation position corresponds to the first indicating icon. The second operation position corresponds to the second indicating icon. The time instant T1 generally refers to a certain time instant, and is not a fixed time instant. The time instant T1 is determined based on the time of the input operation of the user in the first operation position and the time of the input operation of the user in the second operation position.

In step S430, the electronic device is controlled to perform the first function corresponding to both the first indicating icon and the second indicating icon, based on the input operation.

In an embodiment of the disclosure, since the first indicating icon and the second indicating icon represent the one function, the electronic device performs the corresponding function in response to the input operation only if the user performs the input operations at the first operation position and the second operation position at the same time.

Figure 5:
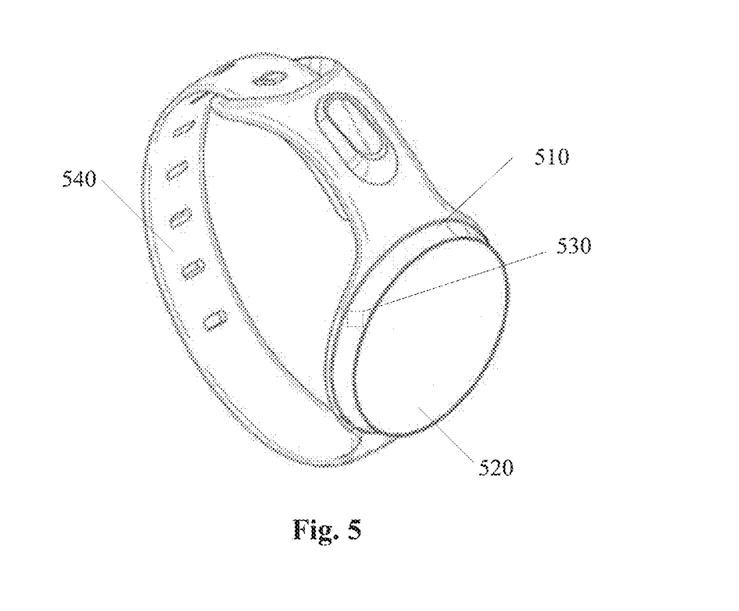
FIG. 5 is a schematic structural diagram of an electronic device according to an embodiment of the disclosure.

Referring to FIG. 5, a schematic structural diagram of an electronic device according to an embodiment of the disclosure is shown. The electronic device may include a housing 510, a display screen 520, K inputting apparatuses 530, a fixing device 540 and a processor 550 (not shown).

The display screen 520 is fixed in the housing 510 and a display output area of the display screen 520 is visible through a first surface of the housing 510.

The K inputting apparatuses 530 are fixed in the housing 510 and an operation surface of each of the K inputting apparatuses 530 is exposed through a lateral surface (the whole circumferential surface defining the display output area) of the housing 510.

In the present disclosure, the K inputting apparatuses may be at least one key, touch sensing unit, pressure sensor, distance sensor, voice module or the like, where K is a positive integer equal to or greater than 1. In practice, the electronic device may include multiple inputting apparatuses, and the multiple inputting apparatuses may correspond to one touch sensing unit, key, pressure sensor, voice module, distance sensor or the like. In this case, the operation surfaces of the multiple inputting apparatuses form the whole circle of the lateral of the housing. Practically, each inputting apparatus may correspond to one key, pressure sensor, distance sensor or voice module, and then the electronic device may determine the operation position of the indicating icon on the operation surface exposed through the lateral surface of the housing based on the display position of the indicating icon in the current display interface.

Figure 6:
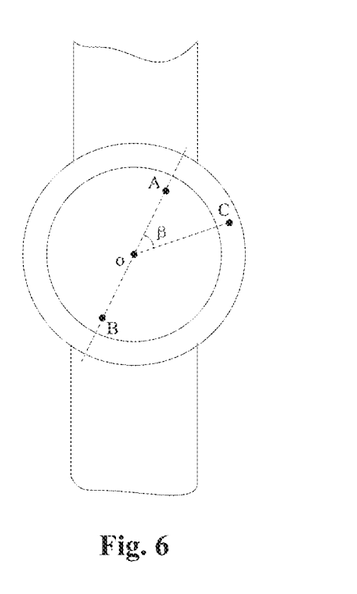
FIG. 6 is a schematic diagram of a correspondence between an operation position and an indicating icon of an electronic device according to an embodiment of the disclosure.

As shown in FIG. 6, if two indicating icons of an indicating icon A and an indicating icon B are displayed in the display interface in the display output area of the display screen, two inputting apparatuses may be provided in the housing. By taking a central point O of the display screen as a reference point, and taking a connection line OA or OB between the indicating icon A or B and the central point O as a reference line, the operation surface ranged from a line which has an angle 90° with the connection line OA in a clockwise direction to a line which has an angle 90° with the connection line OA in an anticlockwise direction corresponds to the indicating icon A. This range of the operation surface is obtained by dividing 360° by the number of the indicating icons displayed in the current display interface. If the user performs an input operation at this operation surface, the function represented by the indicating icon A is performed. Similarly, the operation surface ranged from a line which has an angle 90° with the connection line OB in a clockwise direction to a line which has an angle 90° with the connection line OB in an anticlockwise direction corresponds to the indicating icon B. In practice, if an input operation is performed by the user on the operation surface exposed through the lateral surface of the housing, the processor determines whether to perform the function represented by the indicating icon A or the function represented by the indicating icon B, by detecting an angle β between a connection line between the operation position (i.e., C in FIG. 6) and the central point O and the connection line OA or the connection line OB. For example, if the angle β between connection lines OC and OA is smaller than 90°, the operation position C is on the operation surface corresponding to the indicating icon A, and the function represented by the indicating icon A is performed.

In an embodiment of the disclosure, the lateral of the housing of the electronic device may be stretched in a one-dimensional coordinate system. The stretched lateral surface of the housing is divided into multiple sub-surfaces equally based on the number of indicating icons displayed in current display interface. The sub-surfaces of the lateral surface of the housing corresponding to the respective indicating icons are recorded. In practice, the indicating icon representing the function to be performed by the user may be determined accurately by calculating the distance between the detected operation position and the reference point, and thus determining the indicating icon corresponding to the sub-surface in which the operation position is located.

Figure 7:
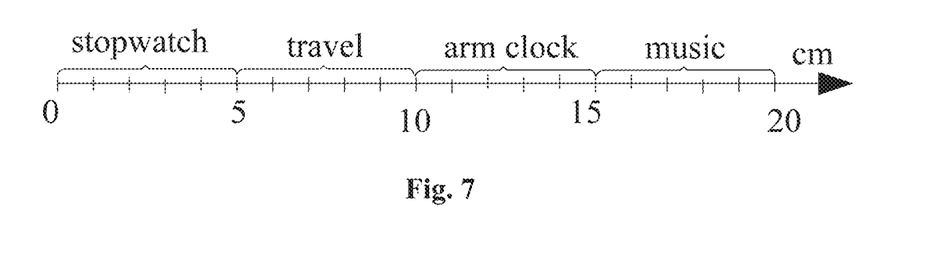
FIG. 7 is another schematic diagram of a correspondence between an operation position and an indicating icon of an electronic device according to an embodiment of the disclosure.

If the current display interface is as shown in FIG. 2(*b*), it is assumed that a circumference of the lateral surface of the housing of the electronic device is 20 cm, and any point on the operation surface between the music indicating icon and the stopwatch indicating icon is taken as the reference point, i.e., the starting point being 0, and the ending point being 20, as shown in FIG. 7. If the distance between the operation position and the reference point ranges in the interval [0, 5), the function represented by the stopwatch indicating icon is performed, i.e., the stopwatch application interface is opened. If the distance between the operation position and the reference point ranges in the interval [5, 10), the function represented by the travel indicating icon is performed, i.e., the travel recording interface is opened. If the distance between the operation position and the reference point ranges in the interval [10, 15), the function represented by the alarm clock indicating icon is performed, i.e., the alarm clock setting interface is opened. If the distance between the operation position and the reference point ranges in the interval [15, 20), the function represented by the music indicating icon is performed, i.e., the music operation interface is opened.

Alternatively, in an embodiment of the disclosure, the plane in which the display screen is located may be taken as a plane in the two-dimensional coordinate system. The coordinate range of the operation surface of the indicating icon on the lateral surface of the housing is set previously. If the user performs an input operation based on the indication of the indicating icon displayed on the display output area of the display screen, the electronic device may determine the function represented by the indicating icon based on the detected coordinates of the operation position, thereby ensuring the consistence between the function to be performed by the electronic device and the operation performed by the user.

In addition to the methods mentioned above, another method may be adopted to determine the correspondence between the indicating icon and the operation surface, for ensuring the consistence between the function to be performed by the electronic device and the operation performed by the user, which is not listed one by one herein. All these determined by those skilled in the art without creative labor fall within the scope of protection of the disclosure.

It is to be noted that the lateral surface of the housing of the electronic device has a certain curvature. To make sure that the electronic device acquire the input operation no matter in which point the input operation is performed by the user on the operation surface of the housing, multiple jointed inputting apparatuses may be provided at the position inside the housing corresponding to the operation surface, and the surface jointed by the multiple inputting apparatuses forms a whole operation surface.

The fixing device 540 is connected to the housing 510, and the fixing device is adapted to fix the electronic device to a support. The fixing device 540 and the housing 510 form a ring-like space, in the case that the electronic device is fixed to the support via the fixing device 540.

If the electronic device is a smart watch, the support may be the wrist of the user. The material of the fixing device 540 may be determined as required, which is not defined in the disclosure.

The processor 550 is provided in the housing 510 and connected to the K inputting apparatuses and M indicating icons, wherein the processor is adapted to acquire an input operation inputted via a first operation position of multiple inputting apparatus, the input operation relating to a first function that corresponds to a first indicating icon; and to perform the first function in response to the input operation, and where M is a positive integer equal to or greater than 1.

The processor being adapted to control the display screen to display the M indicating icons on the periphery of the display output area may include:

the processor being adapted to control the display screen to display the M indicating icons on the periphery of the display output area, wherein the M indicating icons correspond to control instructions to instruct the electronic device to perform N functions, where M and N are positive integers and M≥N≥1; acquire position information of an operation surface of the display output area; and determine an operation position of the operation surface of the display output area, based on the position information of the operation surface of the display output area and the display position of the indicating icon on the periphery of the display output area, wherein the operation position corresponds to a display position of one of the M indicating icon on the periphery of the display output area.

Before controlling the display screen to display the M indicating icons on the periphery of the display output area, the processor 550 may be further adapted to: acquire a call instruction; and start an application corresponding to the call instruction and display the display interface corresponding to the application in the display output area, in response to the call instruction, wherein the M indicating icons are displayed in the display interface.

Before controlling the display screen to display the M indicating icons on the periphery of the display output area, the processor 550 may be further adapted to: acquire a trigger instruction through any one of the operation surfaces of the K inputting apparatuses; and control the display screen to display the M indicating icons on the periphery of the display output area in response to the trigger instruction.

On the basis of the above embodiments, if two indicating icons in the display interface represents one function, the processor 550 is adapted to: control the display screen to display a first indicating icon and a second indicating icon on the periphery of the display output area, with both the first indicating icon and the second indicating icon corresponding to the first function; acquire, via the operation surface exposed through the lateral surface of the housing, both the input operation at the first operation position and an input operation at a second operation position on the operation surface at a time instant T1 simultaneously; and control the electronic device to perform the first function corresponding to both the first indicating icon and the second indicating icon, based on the input operation.

With the above analysis, if the input operation is performed by the user based on the indication of the indicating icon displayed in the current display interface of the display screen, the input operation is obtained by the processor accurately timely, the function represented by the indicating icon is performed without an input operation at the display position of the indicating icon in the display output area, thereby avoiding the inconvenience in the subsequent operations since the information is covered by the operation in the display position.

In the present specification, the embodiments are described in progressive manner, each embodiment focuses on difference of this embodiment from other embodiments, and for similar parts, reference may be made to other embodiments. The electronic device disclosed in the embodiment of the disclosure is adapted to implement the method disclosed in the embodiment of the disclosure, thus the description of the electronic device is relatively simple, and for details, reference may be made to the description of the method.

The above descriptions of the disclosed embodiments enable those skilled in the art to implement or use the present disclosure. Various modifications made to those embodiments will be obvious to those skilled in the art, and the ordinal principles defined in the present disclosure can be implemented in other embodiments without departing from the spirit or the scope of the present disclosure. Therefore, the present disclosure should not be limited to those embodiments disclosed herein, but should be in coincidence with the widest scope in accordance with the principles and the novel characteristics disclosed herein.

What is claimed is:

1. A control method, applied to an electronic device comprising a housing, a display screen, and K inputting apparatuses, wherein the housing comprises a first surface and a side surface, the display screen is fixed in the housing and a display output area of the display screen is visible through the first surface, the side surface is a whole circumferential surface surrounding the display output area, the K inputting apparatuses are touch sensing units and fixed in the housing, an operation surface of each of the K inputting apparatuses is exposed through the side surface, and the operation surfaces of the K inputting apparatuses form a whole circle of the side surface of the housing;

wherein the control method comprises:
controlling the display screen to display M indicating icons on a periphery of the display screen, wherein M is a positive integer equal to or greater than 1;
acquiring an input operation inputted via an inputting apparatus of the K inputting apparatuses, wherein K is a positive integer greater than 1;
determining a first indicating icon of the M indicating icons corresponding to the input operation, comprising:
dividing the whole circle of the side surface of the housing into M sub-surfaces equally;
recording a one-to-one correspondence between the M sub-surfaces and the M indicating icons;
determining a reference point of the whole circle of the side surface;
calculating a distance between the reference point and an operation position where the input operation is inputted along the side surface in a predetermined direction;
determining a sub-surface corresponding to the distance; and
determining an indicating icon corresponding to the sub-surface as the first indicating icon according to the one-to-one correspondence between the M sub-surfaces and the M indicating icons; and
performing a first function on the first indicating icon, wherein the first function relates to the first indicating icon.

2. The control method according to claim 1, wherein
a number of the M indicating icons varies with display interfaces displayed on the display screen; and/or
the function represented by the M indicating icon varies with display interfaces displayed on the display screen.

3. The control method according to claim 2, wherein before the controlling the display screen to display the M indicating icons, the control method further comprises:

acquiring a call instruction; and starting an application corresponding to the call instruction and displaying the display interface corresponding to the application in the display output area, in response to the call instruction, wherein the M indicating icons are displayed in the display interface.

4. The control method according to claim 2, wherein before the controlling the display screen to display the M indicating icons, the control method further comprises:

acquiring a trigger instruction through any one of the operation surfaces of the K inputting apparatuses, wherein the controlling the display screen to display the M indicating icons comprises:

controlling the display screen to display the M indicating icons on the periphery of the display screen in response to the trigger instruction.

5. An electronic device, comprising:

a housing comprising a first surface and a side surface;

a display screen fixed in the housing and a display output area of the display screen is visible through the first surface, wherein the side surface is a whole circumferential surface surrounding the display output area;

K Inputting apparatuses fixed in the housing, wherein the K inputting apparatuses are touch sensing units, an operation surface of each of the K Inputting apparatuses is exposed through the side surface, and the operation surfaces of the K Inputting apparatuses form a whole circle of the side surface of the housing; and a processor adapted to:

control the display screen to display M Indicating icons on a periphery of the display screen, wherein M is a positive Integer equal to or greater than 1;

acquire an Input operation Inputted via an Inputting apparatus of the K Inputting apparatuses, wherein K is a positive Integer greater than 1;

determine a first Indicating icon of the M Indicating icons corresponding to the input operation; and perform a first function on the first Indicating icon, wherein the first function relates to the first Indicating icon;

wherein when the processor determines the first Indicating icon of the M Indicating icons corresponding to the input operation, the processor is further adapted to:

divide the whole circle of the side surface of the housing into M sub-surfaces equally;

record a one-to-one correspondence between the M sub-surfaces and the M indicating icons;

determine a reference point of the whole circle of the side surface;

calculate a distance between the reference point and an operation position where the input operation is inputted along the side surface in a predetermined direction;

determine a sub-surface corresponding to the distance; and determine an indicating icon corresponding to the sub-surface as the first indicating icon according to the one-to-one correspondence between the M sub-surfaces and the M indicating icons.

6. The electronic device according to claim 5, comprising: a fixing device, wherein the fixing device is connected to the housing, the fixing device adapted to fix the electronic device to a support.

7. The electronic device according to claim 6, wherein the K inputting apparatuses comprise at least one of: a plurality of keys, touch sensing units, pressure sensors, or voice modules.

8. The electronic device according to claim 7, wherein the processor is further adapted to acquire a call instruction; and start an application corresponding to the call instruction and display a display interface corresponding to the application in the display output area, in response to the call instruction, wherein the M indicating icons are displayed in the display interface.

9. The electronic device according to claim 7, wherein the processor is further adapted to:

acquire a trigger instruction through any one of the operation surfaces of the K inputting apparatuses; and control the display screen to display the M indicating icons on a periphery of the display output area in response to the trigger instruction.

10. The electronic device according to claim 5, wherein the processor is adapted to:

control the display screen to display a second indicating icon and a third indicating icon on the periphery of the display output area, with both the second indicating icon and the third indicating icon corresponding to the first function;

acquire, via the operation surface exposed through the side surface of the housing, both the input operation at a first operation position and an input operation at a second operation position on the operation surface simultaneously at a time instant T1; and control the electronic device to perform the first function corresponding to both the second indicating icon and the third indicating icon, based on the input operation.

* * * * *